Dec. 9, 1930.  H. H. FRANKS  1,784,003
WALKING BEAM STIRRUP
Filed Dec. 9, 1929
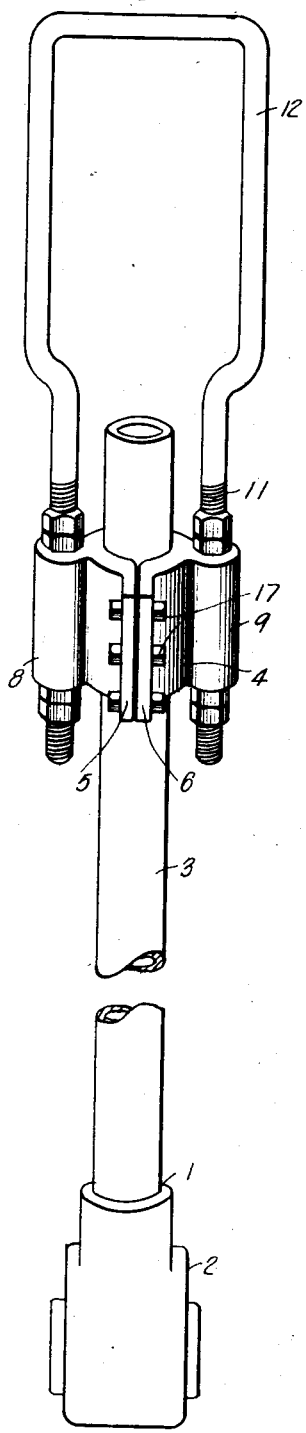
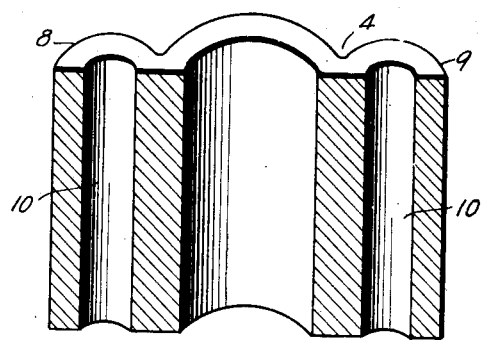
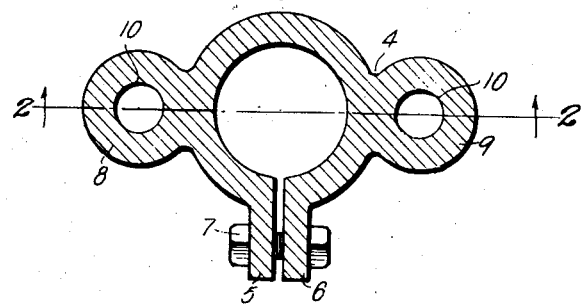
INVENTOR
Harry H. Franks
BY
ATTORNEY Patented Dec. 9, 1930

1,784,003

UNITED STATES PATENT OFFICE

HARRY H. FRANKS, OF TULSA, OKLAHOMA, ASSIGNOR OF THREE-FOURTHS TO TIDAL OIL COMPANY, OF TULSA, OKLAHOMA, A CORPORATION OF OKLAHOMA

WALKING-BEAM STIRRUP

Application filed December 9, 1929. Serial No. 412,796.

My invention relates to a pitman connector, and more particularly to a device of that character for use with oil well pumping rigs for connecting the band wheel with the walking beam; the principal object of the invention being to provide adjustment in the connection for adapting the walking beam for different strokes, for taking up wear or other purposes for which an adjustment may be required.

In accomplishing these objects of the invention, I have provided improved details of structure, the preferred form of which is illustrated in the accompanying drawings, wherein:

Fig. 1 is a perspective view of a pitman of the character described equipped with a connector embodying my invention.

Fig. 2 is a cross section of the connector bracket on the line 2—2, Fig. 3.

Fig. 3 is a transverse section of the bracket.

Referring in detail to the drawings:

1 designates a pitman including a hub member 2 for attachment to the band wheel of a well drilling rig in accordance with common practice, and 3 the pitman rod which extends to position for connection with a walking beam (not shown).

Slidably mounted on the rod 3 is a split bracket 4 having ears 5 and 6 connected by bolts 7 for drawing the ears together to clamp the bracket securely on the rod.

Formed integrally with the bracket 4 and extending laterally from the opposite sides thereof, are paired collars 8 and 9 having smooth bores 10 for receiving the threaded shanks 11 of a stirrup 12 of the type ordinarily employed with well pumping equipment, for fitting over the walking beam and connecting the beam with the pitman.

With the parts constructed as described, the stirrup is assembled with the bracket 4 by projecting the stirrup shanks 11 through the bracket collars and anchoring the shanks to the bracket by the lock nuts. The stirrup is then slipped over the walking beam to a position for providing the desired working adjustment of the beam, and the bracket slipped onto and clamped to the pitman by the bolts 7, so that when the pitman is actuated the beam will be oscillated without lost motion.

It is apparent that with the adjustable connector which I have provided, it is unnecessary to effect the final adjustment of the pitman on the beam at the first operation, but that the adjustment may be effected after a rough initial connection through the adjustability of the bracket on the pitman rod and of the stirrup shanks in the bracket.

What I claim and desire to secure by Letters Patent is:

1. A pitman connector including in combination with a pitman rod, a bracket on the rod, and a stirrup adjustably mounted on the bracket.

2. A pitman connector including in combination with a pitman rod, a bracket on the rod having collar members, and a stirrup having shanks adjustably retained in said collar members.

3. A pitman connector including in combination with a pitman rod, a bracket on the rod having collar members, a stirrup having threaded shanks extended through the collar members, and set screws in said shanks engaging said collar members to adjustably attach the stirrup to the bracket.

4. A pitman connector including in combination with a pitman rod, a split bracket adapted for selective application to said rod, means for attaching the bracket to the rod, and a stirrup mounted on the bracket.

5. A pitman connector including in combination with a pitman rod, a bracket adjustably mounted on said rod, and a stirrup adjustably mounted on said bracket.

In testimony whereof I affix my signature.

HARRY H. FRANKS.